March 30, 1954   F. DOUGLAS   2,673,768
CLUTCH RELEASE BEARING
Filed Jan. 5, 1952
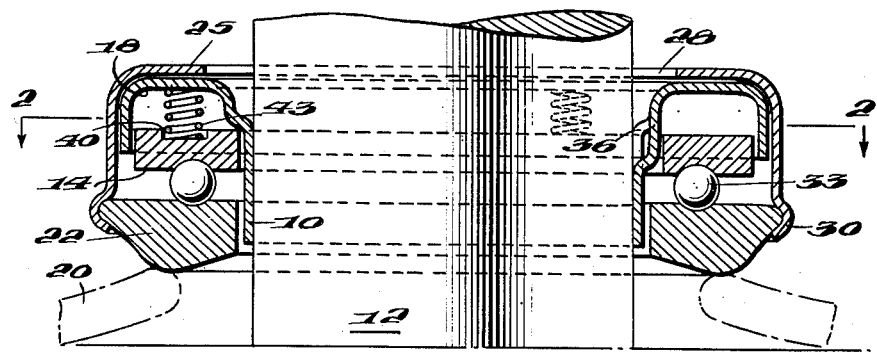
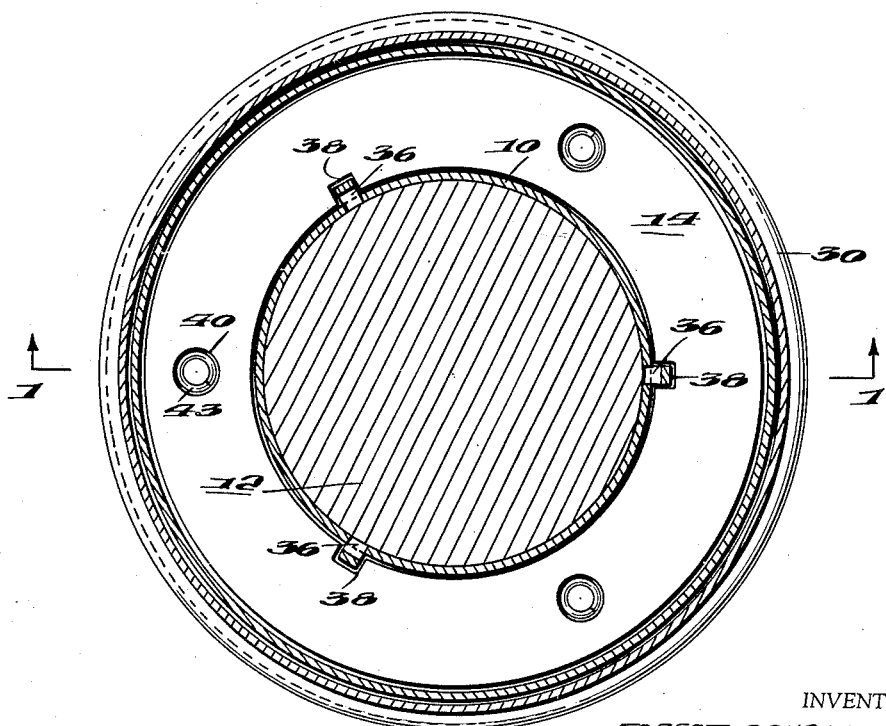
INVENTOR
FOREST DOUGLAS,
BY
ATTORNEY Patented Mar. 30, 1954

2,673,768

UNITED STATES PATENT OFFICE 2,673,768

CLUTCH RELEASE BEARING

Forest Douglas, Fairfield, Ill., assignor to Airtex Products Inc., a corporation of Illinois Application January 5, 1952, Serial No. 265,179

2 Claims. (Cl. 308—233)

This invention relates to clutches, and more particularly to a clutch release bearing.

I have found that clutch release bearings are subject to frequent breakdown under conditions of long, hard service, particularly on trucks. This appears to be caused by looseness in the bearing effected by wear of the races. To the best of my observation, when the races start to wear, the balls of a ball bearing no longer track concentrically about the axis of the bearing and continued use of the bearing results in progressive damage until the bearing breaks down entirely.

It is an object of my invention to overcome breakdown in clutch release bearings. It is a further object of my invention to modify conventional bearings in such a way as to considerably increase the life thereof. It is an additional object of my invention to provide a structure of an extremely simple nature and which lends itself easily to manufacture by mass production methods.

In accordance with my invention, I provide a clutch release bearing structure comprising a spring biased fixed race wherein the balls between the fixed and live races are maintained substantially centrally of the race grooves and thus retain their concentricity with respect to the bearing axis.

My invention will now be described in conjunction with the appended drawing in which:

Figure 1 is a section taken transversely through a bearing in the plane of the axis; and Figure 2 is a section through 2—2 of Figure 1.

With reference to the figures of the drawing, my improved clutch release bearing construction comprises a sliding hub 10 mounted on a transmission shaft 12, which hub is formed in the shape of a housing for accommodating the fixed race 14 of the bearing. Thus the hub 10 terminates in a housing 18, hereafter referred to as the inner housing, and within said housing the fixed race 14 is disposed with a suitable degree of tolerance peripherally with respect to the side walls of the housing so as to permit a certain amount of play. From two to three one-hundredths of an inch clearance radially permits the fixed race to follow the balls and to confine them in the grooves upon release of the clutch pressure fingers 20 should the live race 22 have a tendency to move radially.

The live race 22 is carried in an outer shell or housing 25 having an aperture 28 which clears the shaft 12. The outer rim 30 of housing 25 is clinched around the rim of the live race 22 as shown. Balls 33 are disposed intermediate the races in a conventional manner.

The inner shell 18 has a plurality of straps 36 struck therefrom and these straps engage respective notches 38 milled in the inner periphery of fixed race 14. Thus the race 14 cannot rotate with respect to the sliding hub 18. The back surface of the race 14 is provided with a plurality of shallow sockets 40 which accommodate the ends of respective springs 43, the other ends of springs 43 abutting the inner surface of the shell 18. In that manner the springs 43 are retained in position and exert a constant biasing force against fixed race 14 peripherally about the race and with sufficiently even distribution so as to maintain the balls 33 in concentric disposition with respect to the bearing axis by virtue of pressure on the balls exerted by the grooves of the races.

The number of springs is not critical just so long as even biasing force distribution is maintained on the fixed race 14.

I have found in actual tests that a clutch release bearing constructed in accordance with the teaching hereinabove set forth is superior to the conventional clutch release bearing wherein no biasing force is exerted to maintain the balls in proper concentric relation. In actual tests performed by me, I have found that my clutch release bearing stands up and gives continued good service long after an ordinary bearing would have broken down.

I believe that this substantial improvement in performance is due to maintenance of the balls in their grooves under a biasing force so as to insure concentricity of the balls with respect to the bearing axis. I am aware that various modifications of my invention are possible. For example, leaf type springs may be used in place of the coil springs shown; and other arrangements and shapes of the races and housings may be used. Accordingly, I do not wish to be limited to the specific disclosure hereinabove illustrated except as set forth in the appended claims.

I claim:

1. In a device of the class described, a sliding hub, a clutch release bearing carried by said hub and having an inner shell secured thereto, said inner shell having a portion substantially U-shaped in section, a ball bearing race disposed in said inner shell within said U-shaped section and being spaced from the walls thereof, a plurality of springs disposed intermediate said race and a wall of said U-shaped section so as to bias said race toward the open side of said section, a plurality of slots provided in the inner annulus of said race, a plurality of lugs carried by a wall of said inner shell and engaging corresponding slots to effect rotation of said race with said inner shell, said hub comprising an outer shell peripherally surrounding said inner shell and being rotatively retained thereon, a ball bearing race carried by said outer shell, a plurality of ball bearings retained intermediate said races.

2. A clutch release bearing comprising a hub slidable on a transmission shaft and having a shell-like formation, a ball bearing race slidably accommodated within said formation, a plurality of springs within said formation compressed intermediate a surface thereof and said race for maintaining a constant outward bias of said race, an additional race, ball bearings intermediate said races, and means for maintaining said races in contiguity with said ball bearings, wherein said last mentioned means comprises a housing embracing a portion of said additional race and a portion of said shell-like formation so as to hold the assembly of said races, ball bearings, springs, and hub in unitary condition.

FOREST DOUGLAS.

References Cited in the file of this patent

UNITED STATES PATENTS

| Number | Name | Date |
| --- | --- | --- |
| 1,053,715 | Cromwell | Feb. 18, 1913 |
| 1,556,997 | Johnson | Oct. 13, 1925 |
| 1,606,127 | Kolb | Nov. 9, 1926 |
| 1,966,146 | Stanley | July 10, 1934 |
| 2,030,813 | Dolza | Feb. 11, 1936 |
| 2,164,497 | Chamberlain | July 4, 1939 |
| 2,347,483 | Katcher | Apr. 25, 1944 |